United States Patent [19]

Okayama et al.

[11] Patent Number: 5,867,696
[45] Date of Patent: Feb. 2, 1999

[54] SAVING A PROGRAM COUNTER VALUE AS THE RETURN ADDRESS IN AN ARBITRARY GENERAL PURPOSE REGISTER

[75] Inventors: Sachiko Okayama; Hiroshi Katsuta, both of Tokyo, Japan

[73] Assignee: NEC Corporation, Tokyo, Japan

[21] Appl. No.: 594,296

[22] Filed: Jan. 30, 1996

[30] Foreign Application Priority Data

Jan. 31, 1995 [JP] Japan ................................. 7-034671

[51] Int. Cl.⁶ .................................................. G06F 9/32
[52] U.S. Cl. ............................................................. 395/580
[58] Field of Search ................................... 395/589, 590, 395/591, 580; 364/933.2

[56] References Cited

U.S. PATENT DOCUMENTS

| | | | |
|---|---|---|---|
| 4,777,587 | 10/1988 | Case et al. ............................... | 395/582 |
| 5,515,519 | 5/1996 | Yoshioka et al. ....................... | 395/581 |
| 5,574,873 | 11/1996 | Davidian ................................ | 395/376 |
| 5,652,889 | 7/1997 | Sites ....................................... | 395/708 |

FOREIGN PATENT DOCUMENTS 63-316134  12/1988  Japan .

OTHER PUBLICATIONS

Davidson, J. W. et al.; Reducing the Cost of Branches by Using Registers; Proceedings of the 17th Annual International Symposium on Computer Architecture; pp. 182–191, May 1990.
Jerry Rosenberg; Dictionary of Computers, Information Processing & Telecommunications, 2nd Ed.; p. 256, 1987.
M.J. Mahon et al.; "Hewlett–Packard Precision Architecture: The Processor"; Hewlett Packard Journal, Aug. 1986, pp. 4–22.
S. McGeady; "Inside Intel's i960CA superscalar processor"; Microprocessors and Microsystems, vol. 14, No. 6, Jul./Aug. 1990, pp. 385–396.
European Search Report.

*Primary Examiner*—Parshotam S. Lall
*Assistant Examiner*—Kenneth R. Coulter
*Attorney, Agent, or Firm*—Whitham, Curtis & Whitham

[57] ABSTRACT

An information processor comprises an instruction decoder for executing a subroutine calling instruction including designation of a general-purpose register for calling a subroutine, a circuit for selecting a specific general-purpose register designated by an instruction based on a result of the execution of a subroutine calling instruction among a plurality of general-purpose registers, and a circuit for saving, in a selected general-purpose register, a value obtained by adding a length of a subroutine calling instruction to a program counter value as a return address.

15 Claims, 9 Drawing Sheets

| STEP | SAVING AND RETURN IN/TO PC | CLOCK COUNT |
|---|---|---|
| 301 | GENERAL-PURPOSE REGISTER 130 - PC+4 SET PC | 3 |
| 302 | | |
| 303 | GENERAL-PURPOSE REGISTER 129 - PC+4 SET PC | 3 |
| 304 | | |
| 305 | | |
| 306 | PC - GENERAL-PURPOSE REGISTER 129 | 3 |
| 307 | | |
| 308 | PC - GENERAL-PURPOSE REGISTER 130 | 3 |

TOTAL OF 12 CLOCKS

| STEP | SAVING AND RETURN IN/TO PC | CLOCK COUNT |
|---|---|---|
| 301 | GENERAL-PURPOSE REGISTER 531 - PC+4<br>SET PC | 3 |
| 302 | mem - GENERAL-PURPOSE REGISTER 531<br>SP - SP - 4 | 2 |
| 303 | GENERAL-PURPOSE REGISTER 531 - PC+4<br>SET PC | 3 |
| 304 | mem - GENERAL-PURPOSE REGISTER 531<br>SP - SP - 4 | 2 |
| 305 | SP - SP + 4<br>GENERAL-PURPOSE REGISTER 531 - mem | 2+1 |
| 306 | PC - GENERAL-PURPOSE REGISTER 531 | 3 |
| 307 | SP - SP + 4<br>GENERAL-PURPOSE REGISTER 531 - mem | 2+1 |
| 308 | PC - GENERAL-PURPOSE REGISTER 531 | 3 |

TOTAL OF 22 CLOCKS

FIG. 9
(PRIOR ART)

SAVING A PROGRAM COUNTER VALUE AS THE RETURN ADDRESS IN AN ARBITRARY GENERAL PURPOSE REGISTER

BACKGROUND OF THE INVENTION

1. Field of the Invention

The present invention relates to information processors, and more particularly, to an information processor in which overhead incurred during processing for calling a subroutine and returning therefrom is reduced.

2. Description of the Related Art

In von Neumann type computers, a program counter (hereinafter referred to as PC) indicative of an address of an instruction to be executed is updated to sequentially read and execute programs stored in a memory. In general, central processing units (hereinafter referred to as CPU) of von Neumann type computers need to store, prior to branch from a main program to a subroutine, an address of an instruction to be executed first upon return from a subroutine (hereinafter referred to as a return address).

Description will be given in the following of a conventional information processor including a CPU having a calling instruction for subroutine processing and an instruction to return from the subroutine.

An information processor according to the first prior art is structured to store a return address in a memory by using a general-purpose register as a stack pointer. In this first prior art, a JAL instruction is used as a subroutine calling instruction and a JMP instruction as a returning instruction. JAL instructions are for calling a subroutine by addressing, while JMP instructions are for returning from a subroutine through a register.

Second prior art is disclosed in Japanese Unexamined Patent Publication (Kokai) No. Showa 63-316134 entitled "Semiconductor Integrated Circuit". This second prior art uses a shift register for subroutine processing in place of a memory used as a stack. In addition, the second prior art uses a CALL instruction as a subroutine processing calling instruction and a RET instruction as a return instruction.

Figure 5:
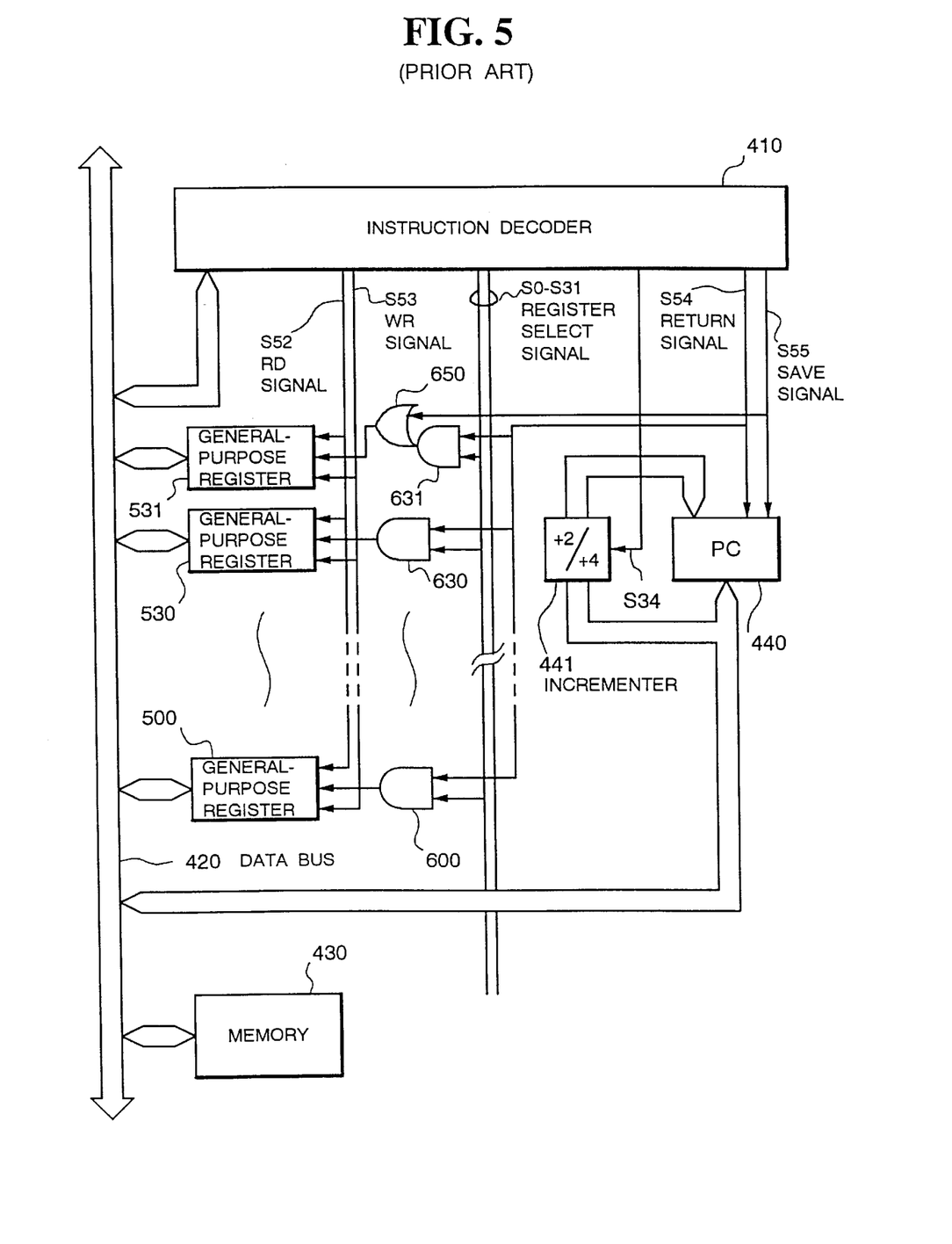
FIG. 5 is a block diagram showing the structure of a first prior art information processor.

In the following, description will be given of structure and operation of these prior art information processors. The structure of the first prior art is shown in FIG. 5. In the figure, the reference numeral 410 represents an instruction decoder, 440 a PC (program counter), 441 an incrementer which increments the value of the PC440 by "2" or "4" in response to a word change-over signal S34, 501 to 531 general-purpose registers, 500 a general-purpose register whose data is fixed at "0", 600 to 631 two-input AND circuits, 650 a two-input OR circuit, 420 a data bus, and 430 a memory. In the first prior art, the memory 430 is used as a stack for return addresses.

The instruction decoder 410 decodes various kinds of instructions including a subroutine calling instruction and a return instruction and based on the results of the decoding, outputs a read signal (RD signal) S52, a write signal (WR signal) S53, a return signal S54, a save signal S55, register select signals S0 to S31, an address of a subroutine and a word change-over signal S34 indicative of a byte count of a decoded instruction (length of an instruction). In addition, the instruction decoder 410 outputs 32-bit address data onto the data bus 420.

The incrementer 441 at all times receives an output of the PC440 and in response to the word change-over signal S34, outputs to the PC440 a sum of a counter value ("2" or "4") equivalent to the length in bytes of an instruction being decoded and the output of the PC440.

The return signal S54 output from the instruction decoder 410 is supplied to ones of the respective inputs of the AND circuits 600 to 631. The save signal S55 from the instruction decoder 410 is supplied to one input of the OR circuit 650.

The register select signals S0 to S31 correspond to the AND circuits 600 to 631, respectively. More specifically, the register select signal S0 corresponds to the AND circuit 600 and the register select signal S31 to the AND circuit 631. The register select signals S0 to S31 are accordingly supplied to the others of the respective inputs of their corresponding AND circuits 600 to 631.

The AND circuits 600 to 630 obtain the AND of the return signal S54 and the register select signals S0 to S30, respectively. The outputs of the AND circuits 600 to 630 are output as select signals for selecting the corresponding general-purpose registers 500 to 530. More specifically when the logical value of the return signal S54 is 11111 and any of the register select signals S0 to S30 attains "1", one of the outputs of the AND circuits 600 to 630 attains "1" to select the corresponding one of the general-purpose registers 500 to 530.

The word change-over signal S34 output from the instruction decoder 410 is a signal which controls the incrementer 441. The word change-over signal S34 takes the logical value "0" when an instruction being decoded is two bytes long and takes the logical value "1" when an instruction being decoded is four bytes long. The incrementer 441 is controlled to add the count value "2" to the PC440 when the logical value of the word change-over signal S34 is "0" and add the count value "4" when the logical value of the word change-over signal S34 is "1".

The AND circuit 631 attains the AND of the return signal S54 and the register select signal S31 and outputs the same to the OR circuit 650. When the return signal S54 is "1" and the register select signal S31 is "1", the output of the OR circuit 650 takes the logical value "1" to select the general-purpose register 531. In addition, when the logical value of the save signal S55 is "1", the output of the OR circuit 650 takes the logical value "1", to select the general-purpose register 531.

The RD signal S52 and the WR signal S53 are supplied to the general-purpose registers 500 to 531. When the RD signal S52 takes the logical value "1", data of a general-purpose register being selected is output onto the data bus 420. When the WR signal S53 takes the logical value "1", data on the data bus 420 is written to a selected general-purpose register.

The instruction decoder 410 outputs an address of a subroutine onto the data bus 420 upon completion of write of a return address to a general-purpose register.

Figure 6:
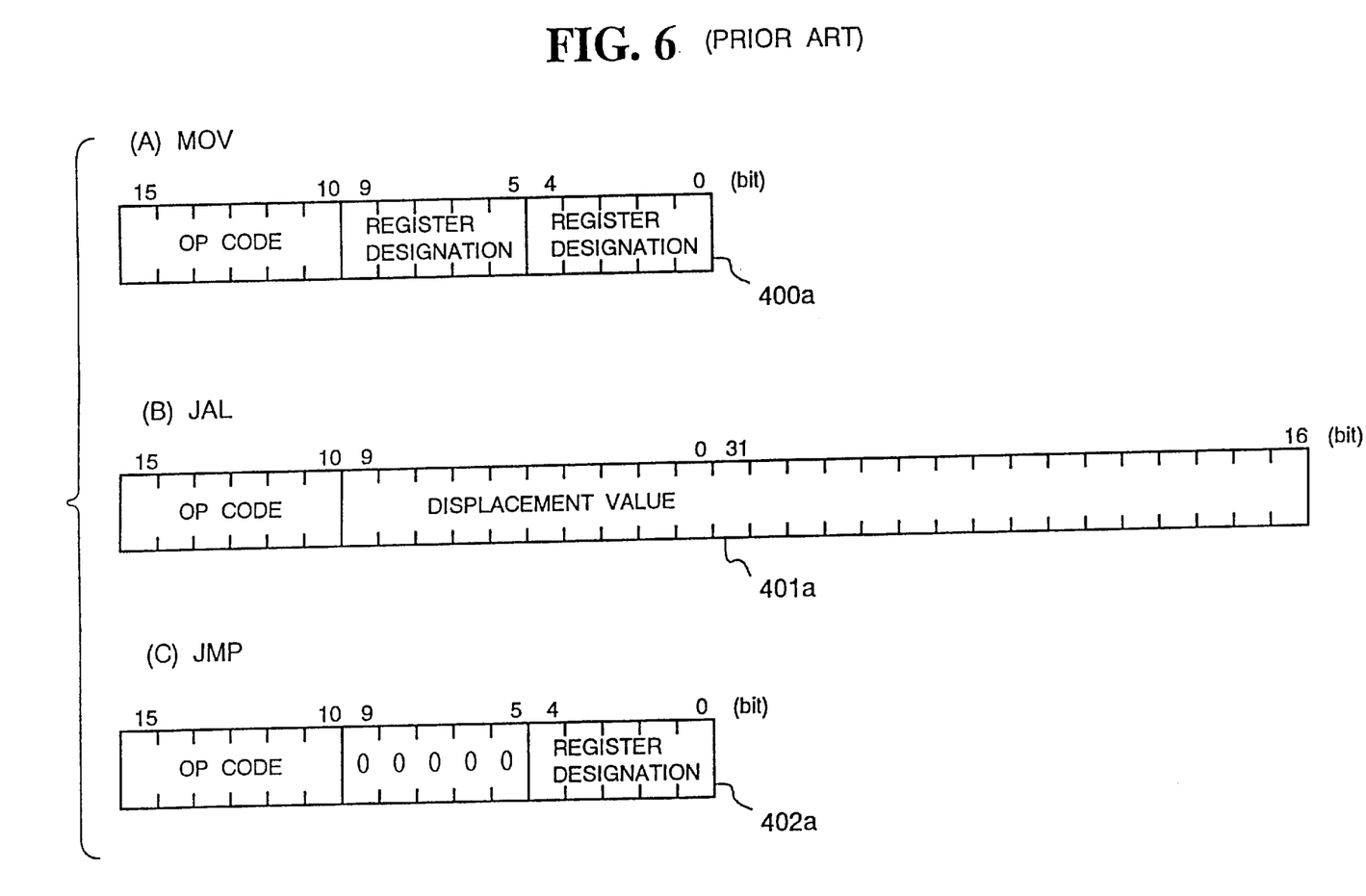
FIG. 6 is a diagram showing one example of instruction codes of the first prior art shown in FIG. 5.

FIG. 6 shows a format of instruction codes to be processed by the information processor illustrated in FIG. 5. For calling a subroutine, a JAL instruction 401a shown in FIG. 6 is executed. Bit numbers 15 to 10 of the JAL instruction 401a represent a field of op codes which direct operation of the JAL instruction 401a. Bit numbers 9 to 0 and 31 to 16 represent a field for setting a displacement value indicative of a branch destination. For returning from a subroutine, a JMP instruction 402a is executed. The JMP instruction 402a is arranged as shown in FIG. 6, in which bit numbers 15 to 10 represent an op code field which directs operation of the JMP instruction. Bit numbers 9 to 5 represent an unused field all set to "0". Bit numbers 4 to 0 represent a field for designating a general-purpose register, which field designates the general-purpose registers 501 to 531 by 5-bit binary numbers. An instruction 400a shows a code arrangement of a register-to-register data transfer instruction (MOV, reg, reg).

With reference to FIGS. 5 and 6, the description will be given of operation for calling a subroutine and for returning therefrom. By decoding the JAL instruction 401a, the instruction decoder 410 outputs the RD signal S52 set to "0", the WR signal S53 set to "1", the return signal S54 set to "0", the save signal S55 set to 11111 and the register select signals S1 to S31 all set to "0" and also outputs the word change-over signal S34 set to "1" because the instruction is four bytes long, and then outputs an address of the subroutine onto the data bus 420.

Here, the JAL instruction 401a is described as follows.

JAL Subroutine Name

Description will be given of processing for executing the JAL instruction 401a to store a return address in the general-purpose register 531. In FIG. 5, when the JAL instruction 401a is decoded by the instruction decoder 410, the save signal S55 and the word change-over signal S34 both attain "1", so that a value which is obtained by incrementing the value of the PC440 by "4" is output as a return address onto the data bus 420. At the same time, the output of the OR circuit 650 attains "1" to select the general-purpose register 531. At this time point, since the WR signal S53 is "1", the return address on the data bus 420 is written to the general-purpose register 531.

On the other hand, since the return signal S54 is "0", all of the AND circuits 600 to 631 output "0". No return address is therefore written to the general-purpose registers 500 to 530.

After the saving of the return address, the instruction decoder 410 outputs an address of a subroutine onto the data bus 420 to set an address of a subroutine called by the PC440, thereby transferring control to the subroutine.

As described in the foregoing, because the general-purpose register 531 is regularly used to save a return address, it is necessary, before returning from a subroutine, to store the contents (return addresses) of the general-purpose register 531 in the memory 430 used as a stack in preparation for a further call to another subroutine as soon as the control transfers to the subroutine. Such stacking of a return address is required because when the JAL instruction 401a is executed to call another subroutine prior to return from a first subroutine, the contents of the general-purpose register 531 are rewritten to lose a return address for the main routine.

For returning from the subroutine, the JMP instruction 402a as a return instruction is executed. 5-bit data of the JMP instruction 402 which designates a general-purpose register is decoded by the instruction decoder 410, so that one of the register select signals S1 to S31 for selecting the designated general-purpose register is output. Moreover, by decoding the JMP instruction 402a, the instruction decoder 410 sets the RD signal S52 to "1", the WR signal S53 to "0", the return signal S54 to "1", the save signal S55 to "0" and one of the register select signals S1 to S31 corresponding to the designated general-purpose register to "1".

The JMP instruction 402a is described as follows.

JMP [General-Purpose Register Name]

Process of reading a return address by executing the JMP instruction 402a will be described with reference to FIG. 5. Here, description will be given of a case where a general-purpose register for reading a return address is the general-purpose register 531. In FIG. 5, first under the program of the subroutine, a return address is read from the memory 430 which stores return addresses and stored in the general-purpose register 531. Thereafter, the JMP instruction 402a which designates the general-purpose register 531 is executed. As a result of decoding of the JMP instruction 402a, the instruction decoder 410 outputs the return signal S54 and the register select signal S31 both set to "1", so that the output of the OR circuit 650 attains "1" to select the general-purpose register 531. At the same time, the instruction decoder 410 outputs the RD signal S52 set to "1", so that the value of the general-purpose register 531 is output onto the data bus 420. In addition, the value of the data bus 420 is set to the PC440 as a return address.

In the first prior art shown in FIG. 5, for the processing of return address saving and returning by regularly using the general-purpose register 531, the return address is saved in the general-purpose register 531 at the time of a subroutine call and the value of the general-purpose register is stacked and held in the memory 430 in preparation for a next subroutine call. It is further necessary to read the return address held at the memory 430 onto the general-purpose register 531 at the time of return from the subroutine. Return addresses are therefore transferred so frequently between the general-purpose register 531 and the memory 430 for the return address saving and returning processing that an overhead is incurred.

In this regard, specific description will be given in the following, for example, of a case of double nesting of a subroutine, that is, a case where another subroutine is called without returning from a subroutine to a main routine.

Figure 7:
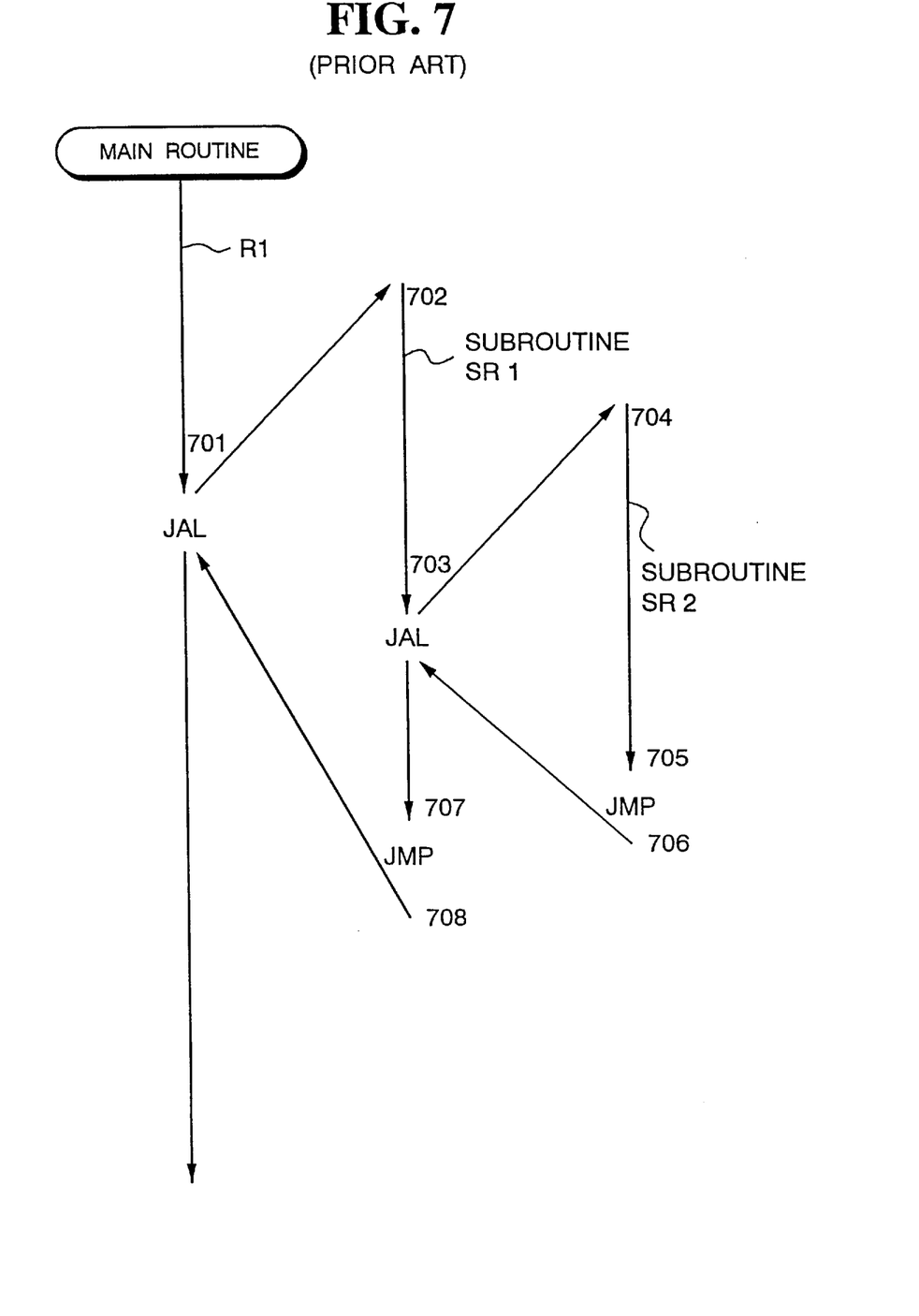
FIG. 7 is a diagram showing a flow of conventional processing for nesting of a subroutine.
Figure 8:
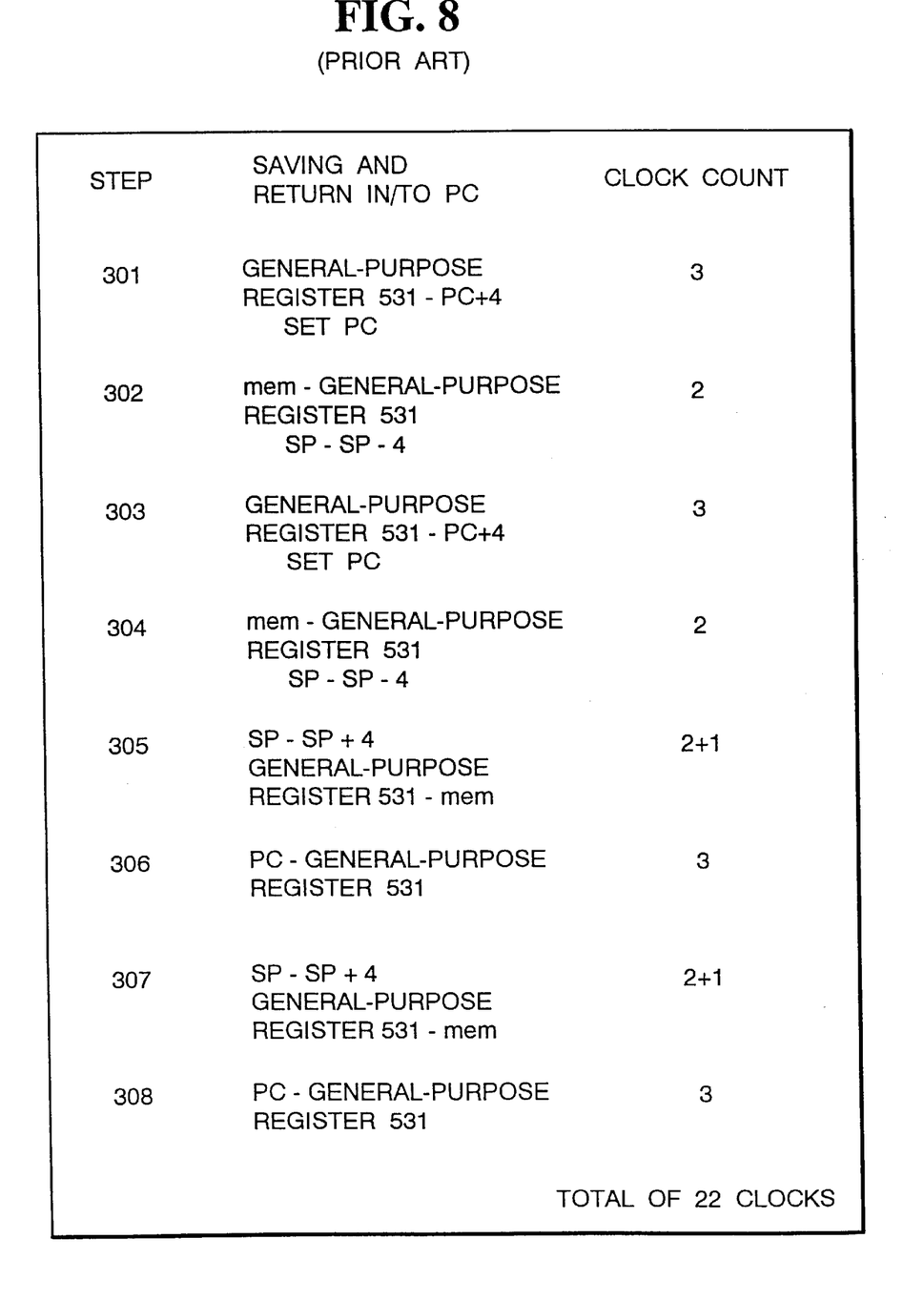
FIG. 8 is a diagram showing return address saving and returning processing and clock count necessary for the processing at each step of the nesting of the subroutine shown in FIG. 7.

FIG. 7 shows nesting operation of subroutines by the JAL instruction 401a and the manner of saving in and returning to the PC440. FIG. 8 shows return address saving and returning processing and the clock count required for the processing at each step of the nesting operation of the subroutines shown in FIG. 7. Here, the program, which is executed in the direction indicated by the arrow, nests out of a main routine R1 into a subroutine SR1 and further into a subroutine SR2. The stack pointer is implemented not by special hardware but by the general-purpose register 503.

When the JAL instruction 401a is executed at Step 701 in the main routine R1, a return address is saved in the general-purpose register 531 to set an address of the subroutine SR1 to PC440. As soon as the control transfers to the subroutine SR1, at Step 702, the contents of the general-purpose register 531 are stored at an address of the memory 430 indicated by the stack pointer (general-purpose register 503) to increment the stack pointer by "4". From Step 702 on, processing of the subroutine SR1 is executed.

When the JAL instruction is executed at Step 703 in the subroutine SR1, a return address is saved in the general-purpose register 531 to set an address of the subroutine SR2 to the PC440. As soon as the control transfers to the subroutine SR2, at Step 704, the contents of the general-purpose register 531 are stored at an address of the memory 430 indicated by the stack pointer to increment the stack pointer by "4". From Step 704 on, processing of the subroutine SR2 is conducted.

When the processing of the subroutine SR2 is completed, the value of the stack pointer is decremented at Step 705 by "4" to call the contents of the memory 430 at an address indicated by the stack pointer into the general-purpose register 531. At Step 706, execution of the JMP instruction 402a results in setting of a return address to the PC440, whereby the control returns to the subroutine SR1.

Then, processing of the subroutine SR1 follows. When the processing completes, the value of the stack pointer is decremented by "4" to call the contents (return address) at an address indicated by the stack pointer into the general-purpose register 531 at Step 707. At Step 708, the JMP instruction 402a is executed to set a return address to the PC440, whereby the control returns to the main routine R1.

Thus it is necessary to store a return address in a memory (stack) and call a return address from the memory at each time of a subroutine call and return from a subroutine, which causes an overhead. As shown in FIG. 7, when another subroutine is called without returning to a subroutine from the main routine, more overhead is incurred by a subroutine call.

Figure 9:
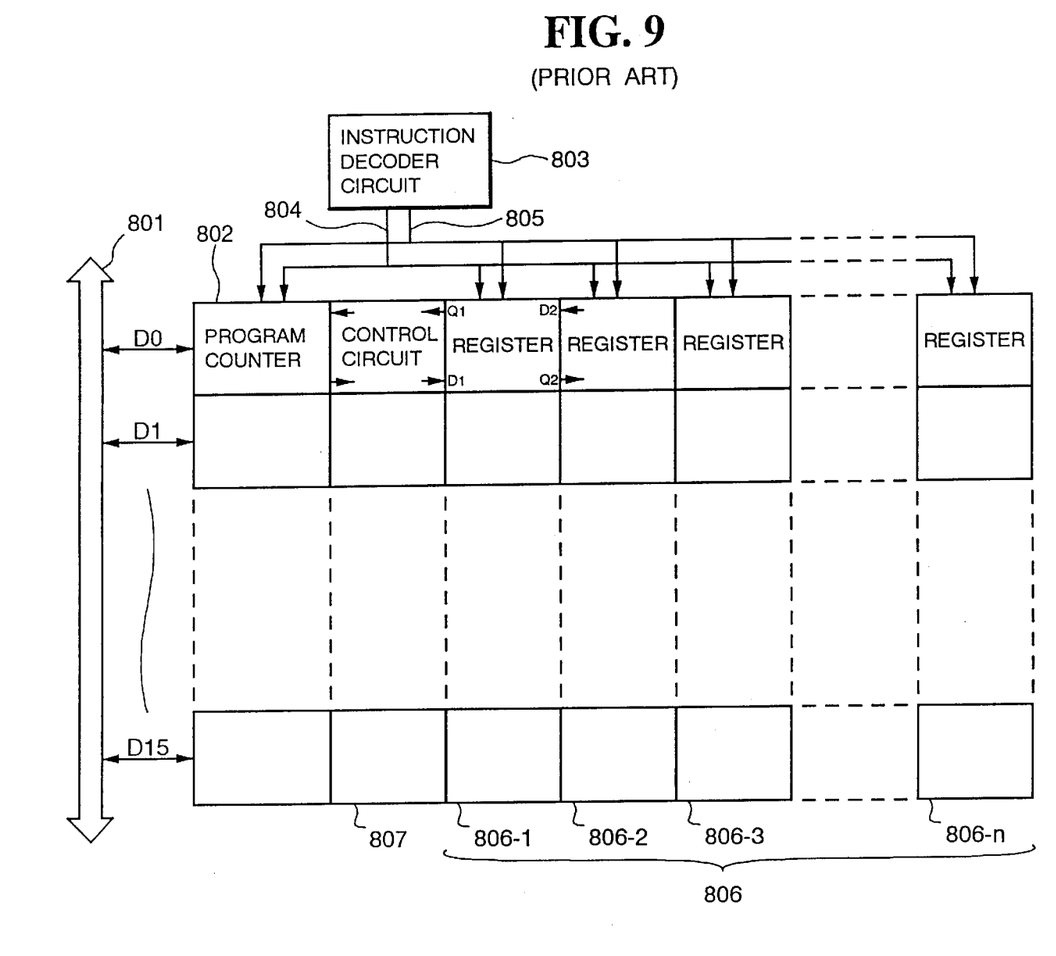
FIG. 9 is a block diagram showing the structure of a second prior art information processor.

The structure of the second prior art is shown in FIG. 9 in which the value of a program counter is saved in a shift register in order to reduce such an overhead caused by the processing for storing a return address in a memory and for returning as required in the first prior art.

In FIG. 9 which shows the structure of the second prior art, the reference numeral 801 represents a 16-bit address bus, 802 a PC for inputting and outputting 16-bit address data D0 to D15 from/to the address bus 801, 803 an instruction decoder circuit for decoding an instruction code which decodes and outputs specific instruction codes (CALL instruction, RET instruction) onto output signal lines 804 and 805, respectively, according to the time of decoding. 806 represents a bi-directional shift register having a last-in first-out function, in which a plurality of stages of registers 806-1 to 806-n are connected. The bi-directional shift register 806 conducts forward shift and backward shift operation in response to the decode output signals 804 and 805 from the instruction decoder circuit 803. The reference numeral 807 represents a control circuit for controlling input/output of data between the PC802 and the shift register 806.

Operation of the second prior art shown in FIG. 9 will be described. When the CALL instruction is executed at the time of a subroutine call, an address (return address) of an instruction existing subsequent to the above-described CALL instruction in the program is indicated by the PC802. Return address, which is the contents of the PC802, is not saved in the memory. A forward shifting operation of the bi-directional shift register 806 is conducted in response to a timing signal generated by a CALL decode output ("1") of the output signal line 804 of the instruction decoder circuit 803 to save the above-described return address in the bi-directional shift register 806.

Then, when the RET instruction is executed upon completion of the subroutine, backward shifting operation of the bi-directional shift register 806 is conducted in response to a timing signal generated by the RET decode output "1" of the output signal line 805 of the instruction decoder circuit 803, whereby the last return address held in the reverse direction of the bi-directional shift register 806 is output first and returned to the PC802 through the control circuit 807.

In addition, when the CALL instruction is successively executed a plurality of times (in other words, the CALL instruction is executed a plurality of times without execution of the RET instructions), forward shifting operation of the bi-directional shift register 806 is conducted every time the CALL instruction is executed as described above. Then, when the RET instruction is executed after the above-described successive execution of the CALL instructions, the up-to-date data of the return addresses held in the bi-directional shift register is read out onto the PC802 by backward shift of the bi-directional shift register 806. When the same number of the RET instructions as that of the CALL instructions are executed, all the return addresses are taken out of the bi-directional shift register 806.

As described in the foregoing, it is unnecessary to use a memory for the purpose of storing and saving return address data of the PC802. Such an overhead as incurred in the first prior art is therefore eliminated.

In the above-described first prior art, because a specific general-purpose register 531 is regularly used to save a return address, every processing for a subroutine call and every processing for returning from a subroutine require a return address of the general-purpose register 531 to be stored in and returned from a memory. As a result, a return address is so frequently transferred between a general-purpose register and a memory that an overhead is incurred to reduce a processing speed.

In the second prior art structured to save a return address in and return the same to a bi-direction shift register, overhead incurred in saving and returning a return address, which is a shortcoming of the first prior art, is reduced. However, the structure of the second prior art needs provision of another dedicated control hardware including a bi-directional shift register. Large scale CPU and more cost are therefore required.

In addition, weighing speed-up of processing against reduction of circuit scale will find it impossible to adopt such a structure as shown in the above-described second prior art into a single-chip microcomputer and the like which attach great importance to the reduction of circuit scale.

SUMMARY OF THE INVENTION

An object of the present invention is to resolve the above problems by providing an information processor whose function of saving a return address in an arbitrary general-purpose register can prevent overhead incurred in saving and returning of a return address during subroutine processing.

Another object of the present invention is to provide a highly economical information processor which allows simple modification of a circuit without provision of dedicated hardware to speed up processing involving no overhead incurred in saving and returning a return address while saving additional cost.

According to the first aspect of the invention, an information processor comprises:

a program counter indicative of an address of an instruction to be executed;

a plurality of general-purpose registers;

execution means for executing a subroutine calling instruction;

means for selecting an arbitrary general-purpose register among the plurality of general-purpose registers at the time of execution of the subroutine calling instruction; and means for saving a program counter value for return of the subroutine in a selected general-purpose register.

In the preferred construction, a code of the subroutine calling instruction is provided with a field for designating a general-purpose register for saving a program counter value for return, and the general-purpose register selecting means selects a general-purpose register in response to a designation signal for the general-purpose register output by the execution of the subroutine calling instruction by the execution means.

In another preferred construction, a code of the subroutine calling instruction is provided with a field for designating a general-purpose register for saving a program counter value for return, the general-purpose register selecting means selects a general-purpose register in response to a designation signal for the general-purpose register output by the execution of the subroutine calling instruction by the execution means, and the saving means saves a value obtained by adding a length of the subroutine calling instruction to the program counter value as the program counter value for return in the selected general-purpose register in response to a save signal of a program counter value for return output by the execution of the subroutine calling instruction by the execution means.

According to the second aspect of the invention, an information processor comprises:

a program counter indicative of an address of an instruction to be executed;

a plurality of general-purpose registers;

means for executing a subroutine calling instruction and an instruction to return from a subroutine;

means for selecting an arbitrary general-purpose register among the plurality of general-purpose registers at the time of execution of the subroutine calling instruction;

means for saving a program counter value for return of the subroutine in a selected general-purpose register; and means for reading the program counter value for return from the general-purpose register which saves the program counter value for return and setting the same to the program counter at the time of execution of the instruction to return from the subroutine.

In the preferred construction, a code of the subroutine calling instruction is provided with a field for designating a general-purpose register for saving a program counter value for return, the general-purpose register selecting means selects a general-purpose register in response to a designation signal for the general-purpose register output by the execution of the subroutine calling instruction by the execution means, the saving means saves a value obtained by adding a length of the subroutine calling instruction to the program counter value as the program counter value for return in the selected general-purpose register in response to a save signal of a program counter value for return output by the execution of the subroutine calling instruction by the execution means, and the means for reading a program counter value for return reads the program counter value for return from the general-purpose register designated by the general-purpose register designation signal output by the execution of the instruction to return from the subroutine by the instruction executing means and sets the same to the program counter.

According to the third aspect of the invention, an information processor comprises:

a program counter indicative of an address of an instruction to be executed;

a plurality of general-purpose registers;

execution means for executing a subroutine calling instruction including designation of a general-purpose register for calling a subroutine;

means for selecting a specific general-purpose register designated by the instruction at the time of the execution of the subroutine calling instruction; and means for saving a program counter value for return of the subroutine in a selected general-purpose register.

In the preferred construction, a code of the subroutine calling instruction is provided with a field for designating a general-purpose register for saving a program counter value for return, the general-purpose register selecting means selects a general-purpose register in response to a designation signal for the general-purpose register output by the execution of the subroutine calling instruction by the execution means, and the saving means saves a value obtained by adding a length, of the subroutine calling instruction to the program counter value as the program counter value for return in the selected general-purpose register in response to a save signal of a program counter value for return output by the execution of the subroutine calling instruction by the execution means.

According to a still further aspect of the invention, an information processor comprises:

a plurality of registers for use in multi-interruption;

means for designating an arbitrary register among the plurality of registers at the time of interruption; and means for storing an address for returning from the interruption in the designated register.

In the above-mentioned construction, an instruction code of the interruption is provided with a field for designating a register for storing a return address, and the register designating means designates a register in response to a designation signal for the register output by the execution of the interruption instruction.

In another preferred construction, an instruction code of the interruption is provided with a field for designating a register for storing a return address, the register designating means designates a general-purpose register in response to a designation signal for the register output by the execution of the interruption instruction, and the storing means saves a value obtained by adding a length of the interruption instruction to a program counter value as the return address in the designated register.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

Figure 1:
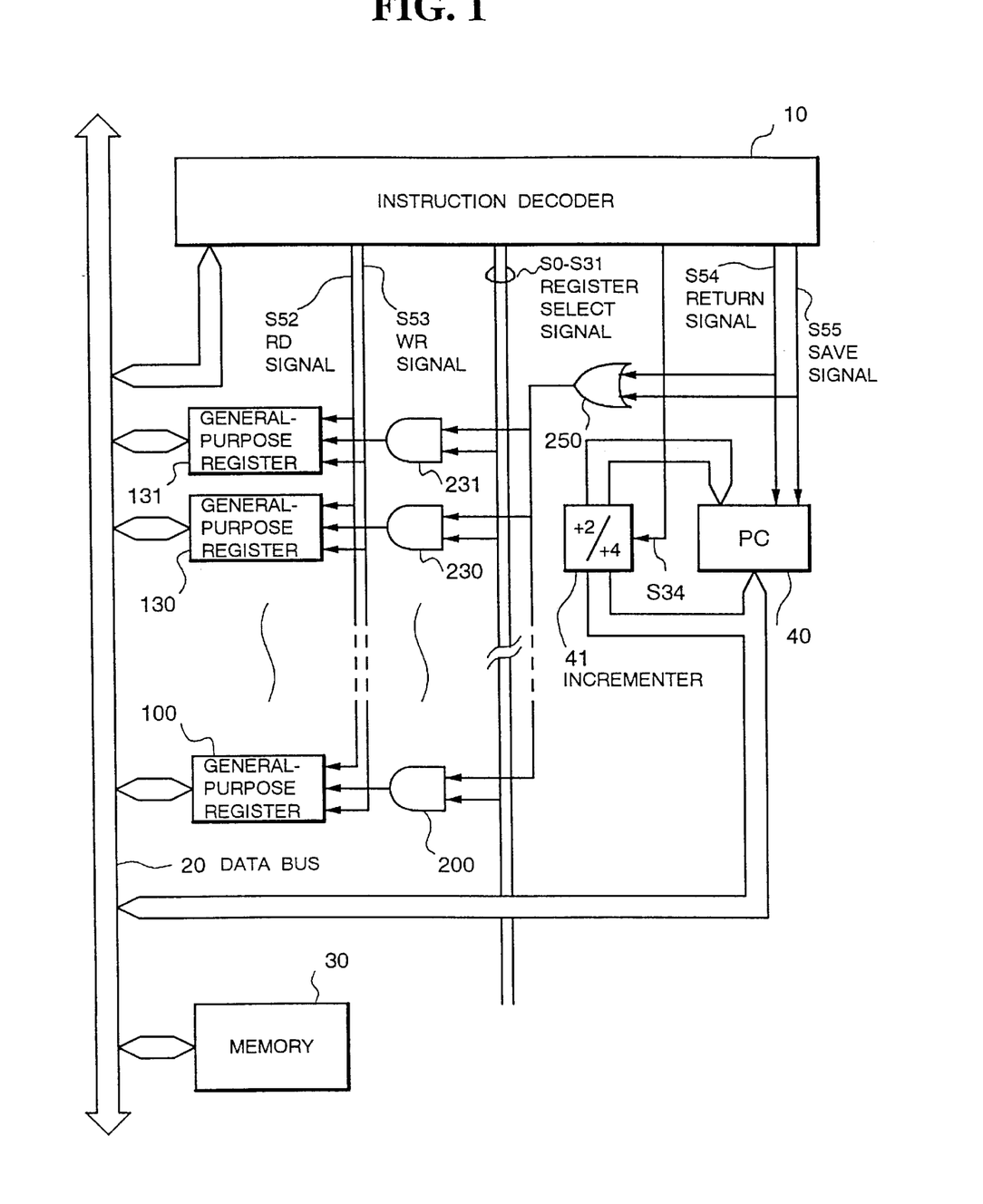
FIG. 1 is a block diagram showing a structure of an information processor according to one embodiment of the present invention.

A preferred embodiment of the present invention will be described in detail with reference to the accompanying drawings. FIG. 1 is a block diagram showing the structure of an information processor according to one embodiment of the present invention. In FIG. 1, which illustrates a part of the structure of an information processor such as a microcomputer, the reference numeral 10 denotes an instruction decoder, 40 denotes a PC, 41 denotes an incrementer, 100 to 131 denote general-purpose registers, 100 denotes a general-purpose register whose date is fixed at "0", 200 to 231 denote two-input AND circuits, 250 denotes a two-input OR circuit, 20 denotes a data bus and 30 denotes a memory.

As illustrated in the figure, the information processor according to the present embodiment has a common structure in most part to that of the first prior art shown in FIG. 5.

In this embodiment, the two-input AND circuit 231 and the two-input OR circuit 250 replace the OR circuit 650 and the AND circuit 631 shown in FIG. 5, respectively.

The instruction decoder 10 is allowed to decode instruction codes different from those of the first prior art and the remaining functions are the same as those of the first prior art. In addition, the memory 30 is not used as a stack of return addresses in the present embodiment. It is also the same manner as that of the first prior art that an address of a subroutine is output onto the data bus 420 upon completion of write of a return address to a general-purpose register by the instruction decoder 10.

The instruction decoder 10 decodes various kinds of instructions such as a subroutine calling instruction and a return instruction and based on the decoding results, outputs a read signal (RD signal) S52, a write signal (WR signal) S53, a return signal S54, a save signal S55, register select signals S0 to S31, an address of a subroutine and a word change-over signal S34 indicative of a byte count of a decoded instruction (length of an instruction).

The incrementer 41 at all times receives an output of the PC40 and in response to the word change-over signal S34, outputs to the PC40 a sum of the counter value ("2" or "4") equivalent to the byte count of an instruction being decoded and the output of the PC40.

In FIG. 1, the return signal S54 and the save signal S55 from the instruction decoder 10 are output to the OR circuit 250. The OR circuit 250 obtains the OR of the return signal S54 and the save signal S55 and outputs the result to ones of the respective inputs of the AND circuits 200 to 230 and 231.

The register select signals S0 to S31 correspond to the AND circuits 200 to 231, respectively. More specifically, the register select signal S0 corresponds to the AND circuit 200, and the register select signal S31 to the AND circuit 231. The register select signals S0 to S31 are therefore supplied to the others of the respective inputs of their corresponding AND circuits 200 to 231. The AND circuit 231 obtains the AND of the register select signal S31 and the output of the OR circuit 250 and outputs the result to the general-purpose register 131.

The AND circuits 200 to 231 respectively obtain the AND of the output of the OR circuit 250 and the register select signals S0 to S30 and output the results as select signals for selecting the corresponding general-purpose registers 100 to 131. More specifically, when the logical value of the return signal S54 or the save signal S55 is "1" and any of the register select signals S0 to S30 attains the logical value "1", one of the outputs of the AND circuits 200 to 231 attains "1" to select one of the corresponding general-purpose registers 100 to 131.

The word change-over signal S34 output from the instruction decoder 10 is a signal for controlling the incrementer 41. The word change-over signal S34 attains the logical value "0" when an instruction being decoded is two bytes long and attains the logical value "1" when an instruction being decoded is four bytes long. The incrementer 41 is controlled to add the count value 11211 to the PC40 when the logical value of the word change-over signal S34 is "0" and add the count value "4" to the PC40 when the logical value of the word change-over signal S34 is "1".

While the first prior art shown in FIG. 5 is structured to regularly save a return address in a specific general-purpose register at the time of a subroutine call, in the present embodiment a general-purpose register for saving a return address is not limited to one specified. In other words, a return address is saved in a general-purpose register arbitrarily designated by a subroutine calling instruction which will be described later.

Figure 2:
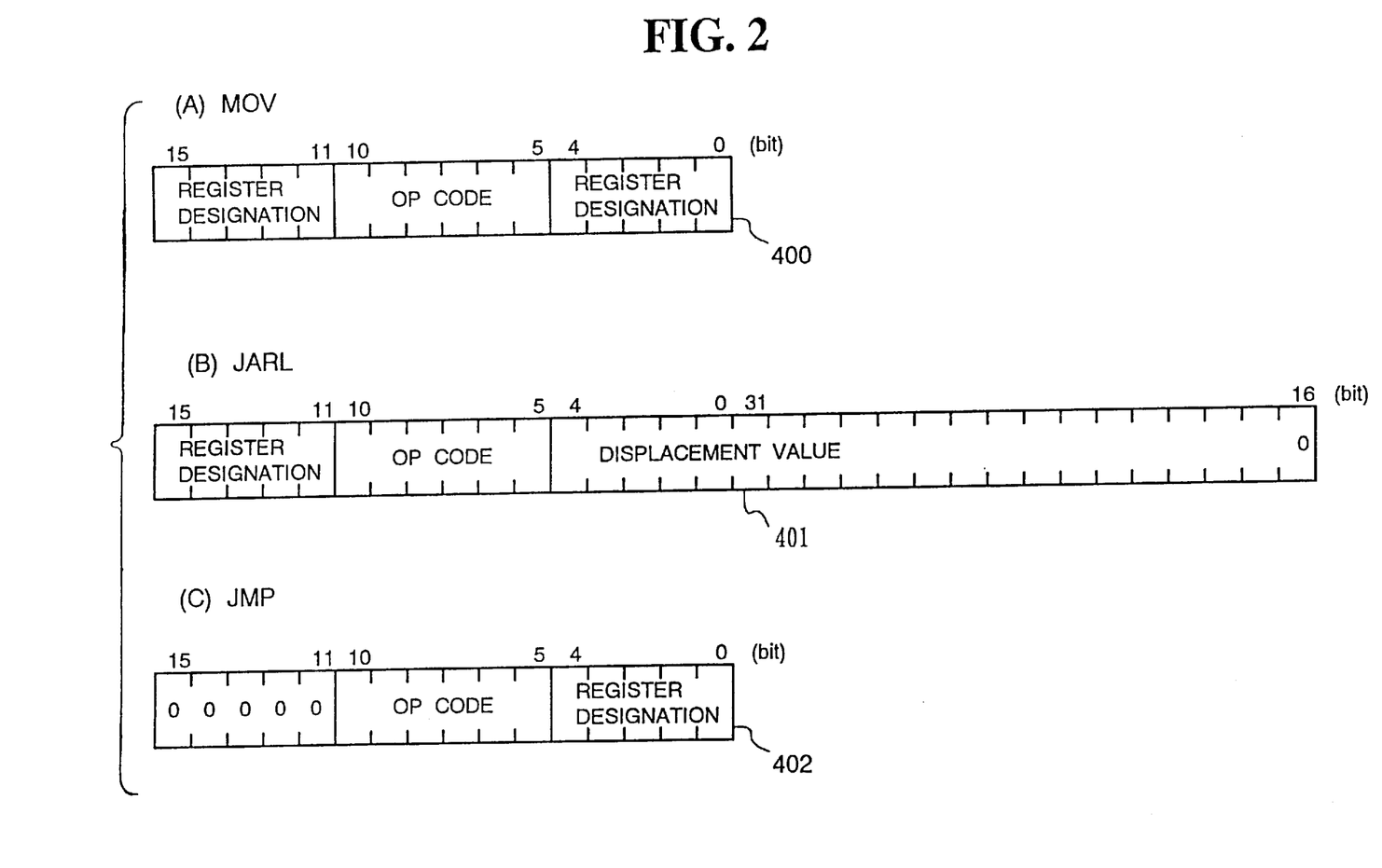
FIG. 2 is a diagram showing one example of arrangement of instruction codes to be executed in the embodiment shown in FIG. 1.

FIG. 2 shows an arrangement of instruction codes to be processed by the information processor according to the present embodiment shown in FIG. 1. For calling a subroutine, a JARL instruction 401 is executed. Bit numbers 10 to 5 of the JARL instruction 401 represent a field of op codes for directing operation of the JARL instruction 401. Bit numbers 15 to 11 represent a register designation field for designating any of the general-purpose registers 101 to 131, which field designates the general-purpose registers 101 to 131 by 5-bit binary numbers. Bit numbers 4 to 0 and bit numbers 31 to 16 represent displacement values indicative of branch destinations (subroutines). An instruction 400 represent a code arrangement of a register-to-register data transfer instruction (MOV reg, reg).

The JARL instruction 401 for a subroutine call and a JMP instruction 402 for return from a subroutine are arranged to have the same format of a register designation field as that of the register-to-register data transfer instruction (MOV reg, reg) 400 or the like.

With reference to FIGS. 1 and 2, operation to be performed at the time of a subroutine call and return from a subroutine will be described.

By decoding the JARL instruction 401, the instruction decoder 10 sets the RD signal S52 to "0", the WR signal S53 to "1", the return signal S54 to "0", the save signal S55 to "1" and a register select signal (any of S1 to S31) corresponding to a general-purpose register designated by the JARL instruction 401 to "1" and outputs an address of a subroutine designated by the JARL instruction 401 onto the data bus 20.

The JARL instruction 401 will be described as follows. JARL Subroutine Name General-Purpose Register Name Here, description will be given of processing to be performed when the general-purpose register 130 is designated by the JARL instruction 401. As a result of the decoding of the JARL instruction 401 by the instruction decoder 10, the save signal S55 attains "1" and the word change-over signal S34 attains "1" to output a return address onto the data bus 20.

At the same time, with the output of the OR circuit 250 being "1" and the register select signal S30 corresponding to the general-purpose register 130 being "1", the output of the AND circuit 230 attains "1" to select the general-purpose register 130. Then, with the WR signal S53 being "1", the value of the return address on the data bus 20 is written to the general-purpose register 130.

In the meantime, the return signal S54 is "0", which has no effect. Furthermore, the instruction decoder 10 outputs an address of a subroutine designated by the JARL instruction 401 onto the data bus 20 to write the address of the subroutine to the PC40.

At the time of return from a subroutine, the JMP instruction 402 is executed. The JMP instruction 402 is made up of instruction codes arranged as shown in FIG. 2. Bit numbers 15 to 11 of the JMP instruction 402 represent an unused field all set to "0". Bit numbers 10 to 5 represent a field of op codes for directing operation of the JMP instruction. Bits numbers 4 to 0 represent a field for designating general-purpose registers, which field designates any of the registers 101 to 131 by 5-bit binary numbers.

By decoding the JMP instruction 402, the instruction decoder 10 sets the RD signal S52 to "1", the WR signal S53 to "0", the return signal S54 to "1", the save signal S55 to "0" and the register select signal (any of S1 to S31) corresponding to a general-purpose register designated by the JMP instruction 402 to "1". Description will be given here of a case where the general-purpose register 130 is designated by the JMP instruction 402.

As a result of the decoding of the JMP instruction 402, the instruction decoder 10 outputs the return signal S54 whose value is set to "1", so that the output of the OR circuit 250 attains the logical value "1". At this time, since the instruction decoder 10 also outputs the RD signal S52 whose value is set to "1", a return address is read out of the general-purpose register 130 and output onto the data bus 20 in response to the RD signal S52. In the meantime, the return address on the data bus 20 is set to the PC40 because the return signal S54 is "1".

Figure 3:
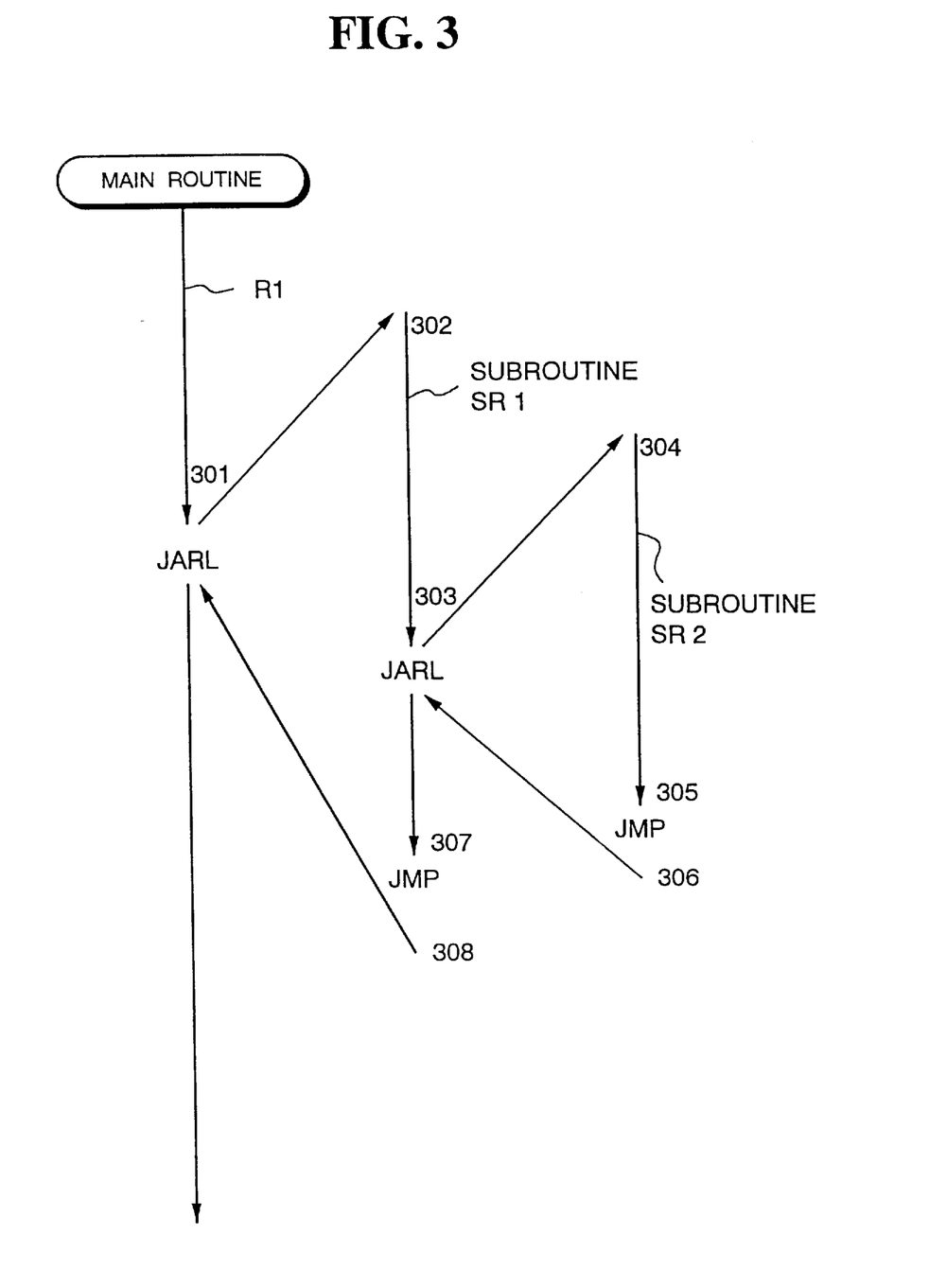
FIG. 3 is a diagram showing a flow of processing for nesting of a subroutine according to the embodiment shown in FIG. 1.
Figure 4:
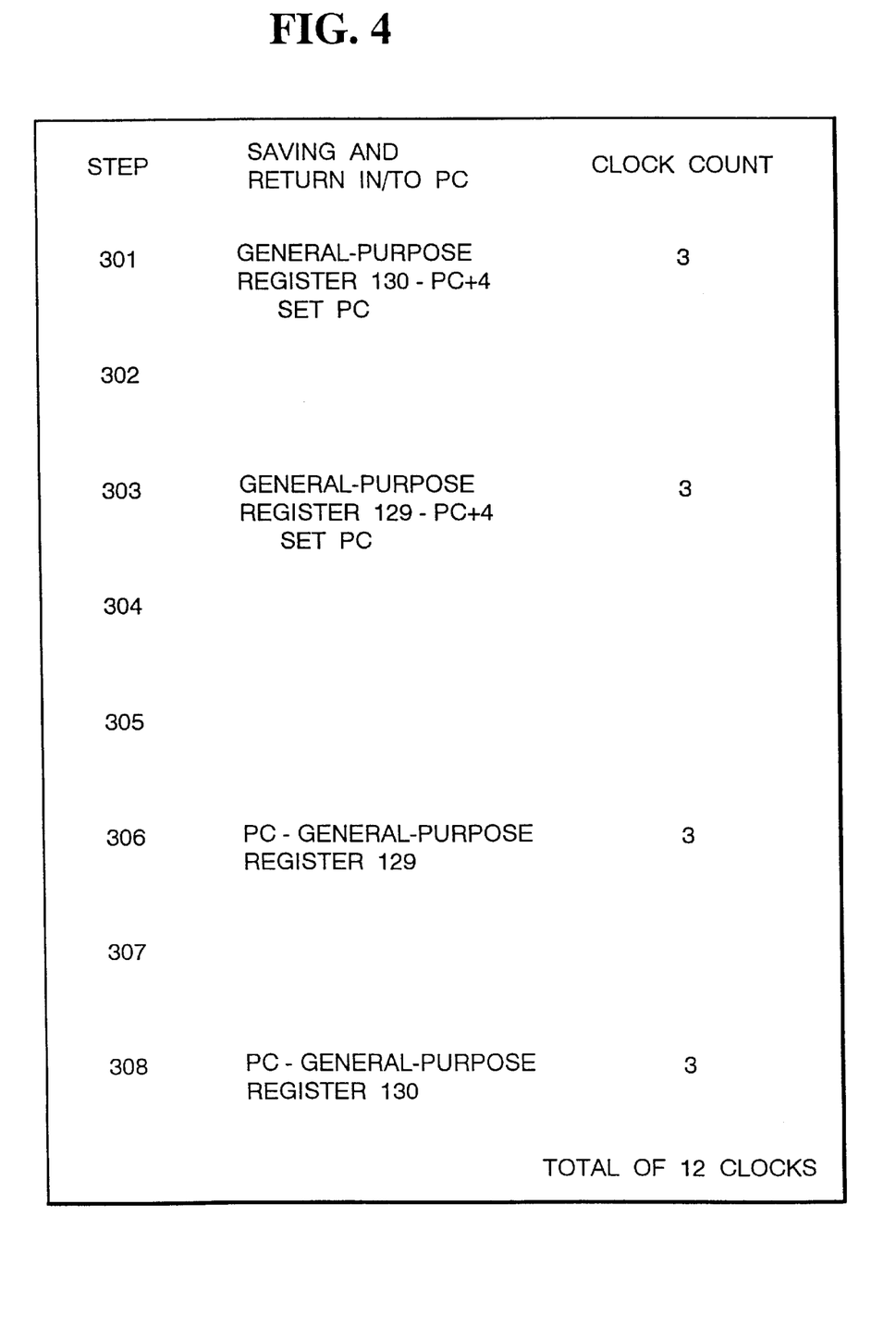
FIG. 4 is a diagram showing return address saving and returning processing and clock count necessary for the processing at each step of the nesting of the subroutine shown in FIG. 3.

FIG. 3, as well as FIG. 7, shows nesting operation of subroutines by the JARL instruction 401 and the manner of processing for saving and returning a return address in and to the PC40. FIG. 4 shows return address saving and returning processing and clock count required for the processing at each step of the nesting operation of the subroutines shown in FIG. 3. The program, which is executed in the direction indicated by the arrow, nests out of a main routine R1 into a subroutine SR1 and then into a subroutine SR2. Here, a return address to be saved in the main routine R1 and a return address to be saved in the subroutine SR1 are saved in the general-purpose registers 130 and 129, respectively.

When the JARL instruction 401 (designating the general-purpose register 130) is executed at Step 301 in the main routine R1, a return address is saved in the designated general-purpose register 130 to set an address of the subroutine SR1 to the PC40. After the control transfers to the subroutine SR1, at Step 302, processing of the subroutine SR1 starts immediately because storage of a return address in the memory 30, which is conventionally required, is unnecessary.

When the JARL instruction 401 (designating the general-purpose register 129) is executed at Step 303 in the subroutine SR1, a return address is saved in the designated general-purpose register 129 to set the address of the subroutine SR2 to the PC40. After the control transfers to the subroutine SR2, at Step 304, processing of the subroutine SR2 is immediately executed without the need of storing a return address in the memory 30.

When the processing of the subroutine SR2 is completed, the JMP instruction 402 (designating the general-purpose register 129) is executed at Step 306 to set the return address read out of the general-purpose register 129 to the PC40, whereby the control returns to the main subroutine SR1. Then, the processing of the subroutine SR1 follows to be conducted. Upon completion of the processing of the subroutine SR1, the JMP instruction 402 (designating the general-purpose register 130) is executed at Step 308 to set a return address read out of the general-purpose register 130 to the PC40, whereby the control returns to the main routine R1.

Thus, the present embodiment requires no processing for storing and returning a value of a return address in and to the memory 30 at the time of calling a subroutine and returning to the same for the similar nesting. Overhead incurred in storing a return address in a memory is therefore eliminated.

In the first prior art, the clock count necessary for return address saving and returning processing totals 22 clocks as shown in FIG. 8. On the other hand, the present embodiment requires the total of 12 clocks for return address saving and returning processing as shown in FIG. 4, which number accounts for only 54 percent of the clocks necessary for the first prior art. Overhead is reduced accordingly.

In addition, as to the instruction decoder of the present embodiment for decoding the JARL instruction 401 including register designation, formatting the codes of the JARL instruction 401 to have the same register designation field as those of the register-to-register data transfer instruction (MOV reg, reg) 400 and the like as illustrated in FIG. 2 enables a decoder for decoding a data transfer instruction to be used also as the above decoder for the JARL instruction. It is therefore unnecessary to provide a decoder dedicated to register designation of the JARL instruction 401. As described in the foregoing, the present embodiment is highly practical because return addresses can be saved in general-purpose registers as long as they are available.

According to the present embodiment, a program counter value for return is written for saving to an arbitrarily selected general-purpose register in response to an output of a decoded subroutine calling instruction. This eliminates an overhead incurred in storing a program counter value for return in a memory and an overhead incurred in returning a program counter value for return from the memory, resulting in realizing high-speed processing of an information processor.

As described in the foregoing, according to the present invention, simple circuit configuration and modification of instruction codes enable saving and return of a return address in and to an arbitrarily general-purpose register, thereby eliminating overhead incurred in calling a subroutine and returning from the same to realize a high-speed information processor.

Moreover, because the present invention realizes elimination of overhead not by newly providing such dedicated hardware as is conventionally adopted but by simple modification of a circuit, it requires no additional cost and is highly economical. Nor increases the circuit scale by the addition of dedicated hardware. The present invention can be therefore adopted into such an information processor to realize high-speed processing as a single-chip microcomputer which attaches great importance to the reduction of a circuit scale.

Although the present invention has been described with respect to the preferred embodiment in the foregoing, the present invention is not limited thereto. The number of general-purpose registers and AND circuits, for example, is not limited to those shown in the figures. In addition, while in the above embodiment the description has been given of a case where a subroutine is called through double nesting, the present invention is applicable also to a case where a subroutine is called through triple or more nesting.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An information processor comprising:
    a program counter indicative of an address of an instruction to be executed;
    a plurality of general-purpose registers; execution means for executing a subroutine calling instruction;
    means for selecting an arbitrary general-purpose register among said plurality of general-purpose registers at the time of execution of said subroutine calling instruction; and
    means for saving a program counter value for return of said subroutine in the selected general-purpose register.

2. An information processor comprising:
    a program counter indicative of an address of an instruction to be executed;
    a plurality of general-purpose registers;
    execution means for executing a subroutine calling instruction;
    means for selecting an arbitrary general-purpose register among said plurality of general-purpose registers at the time of execution of said subroutine calling instruction; and
    means for saving a program counter value for return of said subroutine in a selected general-purpose register,
    wherein a code of said subroutine calling instruction is provided with a field for designating a general-purpose register for saving a program counter value for return, and
    said general-purpose register selecting means selects a general-purpose register in response to a designation signal for said general-purpose register output by the execution of the subroutine calling instruction by said execution means.

3. An information processor as recited in claim 2 wherein said means for selecting an arbitrary general-purpose register selects an additional general purpose register from among said plurality of general-purpose registers at the time of execution of a nested subroutine calling instruction.

4. An information processor comprising:
    a program counter indicative of an address of an instruction to be executed;
    a plurality of general-purpose registers;
    execution means for executing a subroutine calling instruction;
    means for selecting an arbitrary general-purpose register among said plurality of general-purpose registers at the time of execution of said subroutine calling instruction; and
    means for saving a program counter value for return of said subroutine in a selected general-purpose register,
    wherein a code of said subroutine calling instruction is provided with a field for designating a general-purpose register for saving a program counter value for return,
    said general-purpose register selecting means selects a general-purpose register in response to a designation signal for said general-purpose register output by the execution of the subroutine calling instruction by said execution means, and said saving means saves a value obtained by adding a length of said subroutine calling instruction to said program counter value as said program counter value for return in said selected general-purpose register in response to a save signal of a program counter value for return output by the execution of the subroutine calling instruction by said execution means.

5. An information processor as recited in claim 4 wherein said means for selecting an arbitrary general-purpose register selects an additional general purpose register from among said plurality of general-purpose registers at the time of execution of a nested subroutine calling instruction.

6. An information processor comprising:
    a program counter indicative of an address of an instruction to be executed;
    a plurality of general-purpose registers;
    means for executing a subroutine calling instruction and an instruction to return from a subroutine;
    means for selecting an arbitrary general-purpose register among said plurality of general- purpose registers at the time of execution of said subroutine calling instruction;
    means for saving a program counter value for return of said subroutine in the selected general-purpose register; and
    means for reading said program counter value for return from the general-purpose register which saves said program counter value for return and setting the same to said program counter at the time of execution of said instruction to return from the subroutine.

7. An information processor comprising:
    a program counter indicative of an address of an instruction to be executed;
    a plurality of general-purpose registers;
    means for executing a subroutine calling instruction and an instruction to return from a subroutine;
    means for selecting an arbitrary general-purpose register among said plurality of general-purpose registers at the time of execution of said subroutine calling instruction;
    means for saving a program counter value for return of said subroutine in a selected general-purpose register; and
    means for reading said program counter value for return from the general-purpose register which saves said program counter value for return and setting the same to said program counter at the time of execution of said instruction to return from the subroutine,
    wherein a code of said subroutine calling instruction is provided with a field for designating a general-purpose register for saving a program counter value for return and a code of said instruction to return from a subroutine is provided with a field for designating a general-purpose register from which a program counter value for return is to be read,
    said general-purpose register selecting means selects a general-purpose register in response to a designation signal for said general-purpose register output by the execution of the subroutine calling instruction by said instruction executing means, and said means for reading a program counter value for return reads said program counter value for return from said general-purpose register designated by said general-purpose register designation signal output by the execution of the instruction to return from the subroutine by said instruction executing means.

8. An information processor as recited in claim 7 wherein said means for selecting an arbitrary general-purpose register selects an additional general purpose register from among said plurality of general-purpose registers at the time of execution of a nested subroutine calling instruction.

9. An information processor comprising:

a program counter indicative of an address of an instruction to be executed;

a plurality of general-purpose registers;

means for executing a subroutine calling instruction and an instruction to return from a subroutine;

means for selecting an arbitrary general-purpose register among said plurality of general-purpose registers at the time of execution of said subroutine calling instruction;

means for saving a program counter value for return of said subroutine in a selected general-purpose register; and means for reading said program counter value for return from the general-purpose register which saves said program counter value for return and setting the same to said program counter at the time of execution of said instruction to return from the subroutine wherein a code of said subroutine calling instruction is provided with a field for designating a general-purpose register for saving a program counter value for return, said general-purpose register selecting means selects a general-purpose register in response to a designation signal for said general-purpose register output by the execution of the subroutine calling instruction by said execution means, said saving means saves a value obtained by adding a length of said subroutine calling instruction to said program counter value as said program counter value for return in said selected general-purpose register in response to a save signal of a program counter value for return output by the execution of the subroutine calling instruction by said execution means, and said means for reading a program counter value for return reads said program counter value for return from said general-purpose register designated by said general-purpose register designation signal output by the execution of the instruction to return from the subroutine by said instruction executing means and sets the same to said program counter.

10. An information processor as recited in claim 9 wherein said means for selecting an arbitrary general-purpose register selects an additional general purpose register from among said plurality of general-purpose registers at the time of execution of a nested subroutine calling instruction.

11. An information processor comprising:

a program counter indicative of an address of an instruction to be executed;

a plurality of general-purpose registers;

execution means for executing a subroutine calling instruction including designation of a general-purpose register for calling a subroutine;

means for selecting a specific general-purpose register designated by said instruction at the time of the execution of said subroutine calling instruction; and means for saving a program counter value for return of said subroutine in the selected general-purpose register.

12. An information processor comprising:

a program counter indicative of an address of an instruction to be executed;

a plurality of general-purpose registers;

execution means for executing a subroutine calling instruction including designation of a general-purpose register for calling a subroutine;

means for selecting a specific general-purpose register designated by said instruction at the time of the execution of said subroutine calling instruction; and means for saving a program counter value for return of said subroutine in a selected general-purpose register, wherein a code of said subroutine calling instruction is provided with a field for designating a general-purpose register for saving a program counter value for return, and said general-purpose register selecting means selects a general-purpose register in response to a designation signal for said general-purpose register output by the execution of the subroutine calling instruction by said execution means.

13. An information processor as recited in claim 12 wherein said means for selecting a specific general-purpose register selects an additional specific general purpose register designated by said instruction at the time of the execution of a nested subroutine calling instruction.

14. An information processor comprising:

a program counter indicative of an address of an instruction to be executed;

a plurality of general-purpose registers;

execution means for executing a subroutine calling instruction including designation of a general-purpose register for calling a subroutine;

means for selecting a specific general-purpose register designated by said instruction at the time of the execution of said subroutine calling instruction; and means for saving a program counter value for return of said subroutine in a selected general-purpose register, wherein a code of said subroutine calling instruction is provided with a field for designating a general-purpose register for saving a program counter value for return, said general-purpose register selecting means selects a general-purpose register in response to a designation signal for said general-purpose register output by the execution of the subroutine calling instruction by said execution means, and said saving means saves a value obtained by adding a length of said subroutine calling instruction to said program counter value as said program counter value for return in said selected general-purpose register in response to a save signal of a program counter value for return output by the execution of the subroutine calling instruction by said execution means.

15. An information processor as recited in claim 14 wherein said means for selecting a specific general-purpose register selects an additional specific general purpose register designated by said instruction at the time of the execution of a nested subroutine calling instruction.

* * * * *